April 22, 1924.
F. W. BRANDT ET AL
1,491,667
WHEEL RIM
Original Filed Aug. 25, 1922
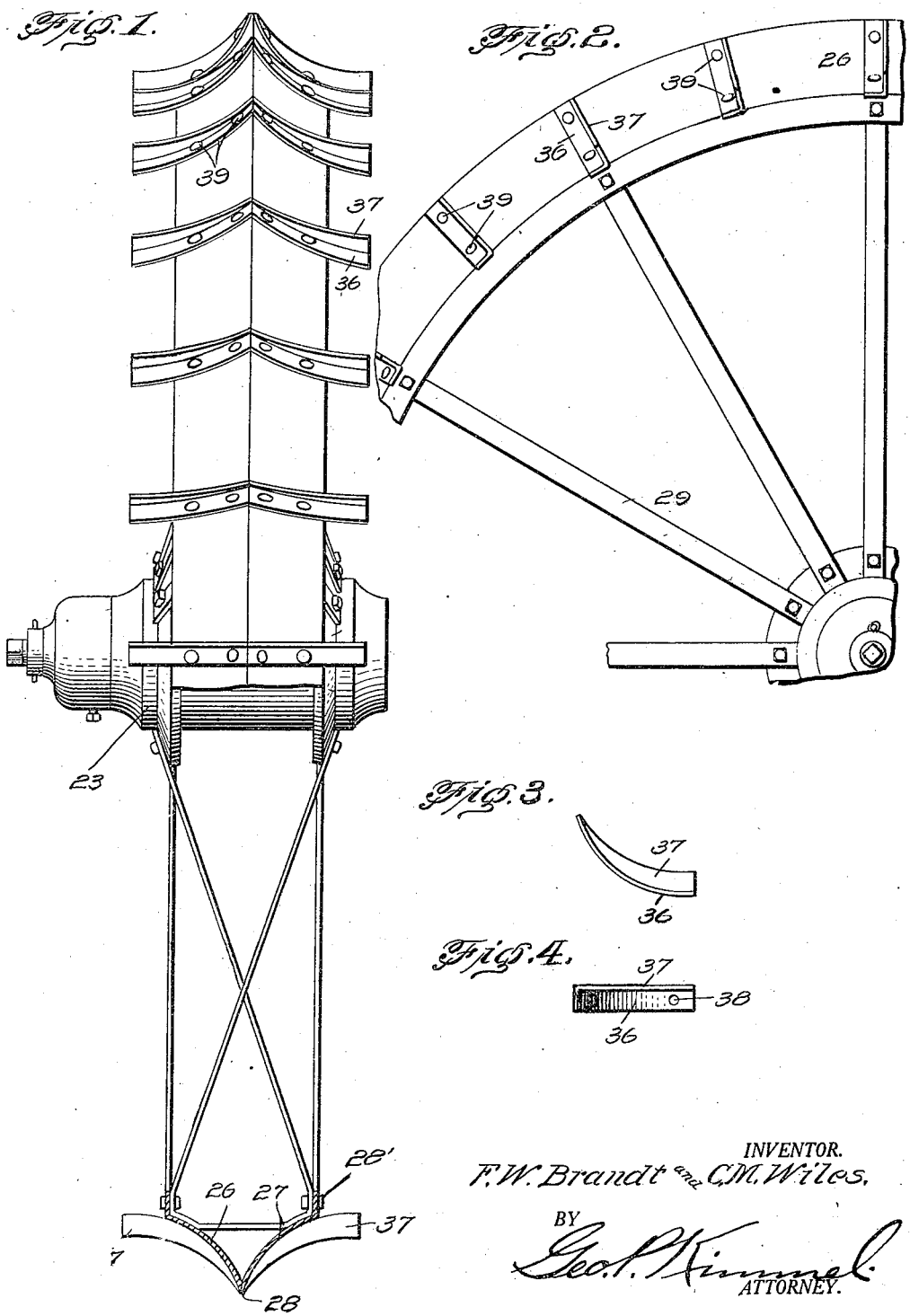
INVENTOR.
F. W. Brandt and C. M. Wiles.
BY
Geo. P. Kimmel
ATTORNEY.

Patented Apr. 22, 1924.

1,491,667

UNITED STATES PATENT OFFICE.

FRIEDRICH W. BRANDT AND CARL M. WILES, OF COLUMBUS, TEXAS.

WHEEL RIM.

Original application filed August 25, 1922, Serial No. 584,304. Divided and this application filed October 31, 1922. Serial No. 598,133.

*To all whom it may concern:*

Be it known that we, FRIEDRICH W. BRANDT and CARL M. WILES, citizens of the United States, residing at Columbus, in the county of Colorado and State of Texas, have invented certain new and useful Improvements in Wheel Rims, of which the following is a specification.

This invention relates to wheels, designed primarily for use in connection with tractors, although it is to be understood that a wheel, in accordance with this invention can be employed for any purpose wherein it is found applicable, and the invention has for its object to provide a wheel in a manner as hereinafter set forth, including a rim having concavo-convex side portions carrying gripping elements corresponding in contour to the contour of the side portions of the rim and providing means to facilitate the traction of the wheel during the travel thereof.

Further objects of the invention are to provide a wheel which is simple in its construction and arrangement, strong, durable, readily set up, efficient in its use and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an edge elevation, partly broken away and partly in section, of a wheel showing the adaptation therewith of a rim in accordance with this invention, Figure 2 is a fragmentary view of the rim in side elevation, Figure 3 is a side view of one of the ground grippers adapted to be secured to a side portion of the rim, Figure 4 is a top plan view of one of the ground grippers.

The invention as described herein and illustrated in the drawings, is a division of the subject matter of our application for Letters Patent filed August 25, 1922, #584,304, subsequently issued as Patent No. 1,447,011, dated Feb. 27, 1923.

Referring to the drawing the rim is substantially V-shaped in cross section and is formed from an annulus of metallic material of desired thickness and consists of a pair of oppositely disposed curved side portions 26, 27, integral at their inner terminus with each other, thereby providing a point 28. The outer terminus of each of the side portions 26, 27, is formed with an inwardly extending flange 28'.

Disposed throughout the outer face of each of the side portions of the rim is a circumferentially extending series of ground gripping members or elements which are arranged transversely with respect to the side portion of the rim. The ground gripping members carried by one side portion of the rim, are oppositely disposed with respect to the ground gripping members carried by the other side portion of the rim. Each of the ground gripping members consists of a curved base 36 rectangular in plan, formed from a flat rectangular strip of material of the same width throughout, and which has formed integral therewith a vertically disposed curved flange 37, which tapers from its outer toward its inner end. The base 36, of each of the ground gripping members is provided with openings 38, through which extend hold-fast devices 39, for securing the member to a side portion of the rim.

The gripper element bases each has the longitudinal median thereof throughout disposed in a radial plane of the wheel coinciding with its axis, and each of said bases conforms in contour to the curvature of a side portion of the rim and extends from the inner to the outer terminus of the side portion.

The vertically disposed flange 37 of each base 36 is formed integral with one side edge of the base and has its upper edge correspondingly curved to the curvature of the base. The flange 37 is of the same length as the base with which it is formed integral and gradually decreases in height from its outer to its inner end.

Each of the ground gripping members is of a length to project outwardly with respect to the flanges 28' of the rim and the gripping members on one side portion are arranged in alignment with respect to the gripping members on the other side portion, so that when the gripping members are secured to the side portions of the rim, the inner ends of the opposed members are arranged in close proximity or in abutting engagement as shown in Figure 1, of the drawings.

From the foregoing description taken in connection with the accompanying drawings, a wheel is set up having means to facilitate traction during the travel of the wheel, and although the drawings illustrate the preferred embodiment of the invention, yet it is to be understood that changes in the detail of construction can be had which will fall within the spirit of the invention as claimed.

What we claim is:—

1. In a tractor wheel, a rim substantially V-shaped in cross section and formed of a pair of oppositely disposed curved side portions, a plurality of curved gripper element bases secured to and extending transversely throughout the outer face of each of said side portions and each having the longitudinal median thereof throughout disposed in a radial plane of the wheel coinciding with its axis, each of said bases conforming in contour to the curvature of a side portion of the rim and extending from the inner to the outer terminus of the side portion, each base being rectangular in plan, and a vertically disposed flange integral with one side edge of each base and having its upper edge correspondingly curved to the curvature of the base, said flange of the same length as the length of the base with which it is formed integral and gradually decreasing in height from its outer to its inner end.

2. In a tractor wheel, a rim substantially V-shaped in cross section and formed of a pair of oppositely disposed curved side portions, a plurality of curved gripper element bases secured to and extending transversely throughout the outer face of each of said side portions and each having the longitudinal median thereof throughout disposed in a radial plane of the wheel coinciding with its axis, each of said bases conforming in contour to the curvature of a side portion of the rim and extending from the inner to the outer terminus of the side portion, each base being rectangular in plan, and a vertically disposed flange integral with one side edge of each base and having its upper edge correspondingly curved to the curvature of the base, said flange of the same length as the length of the base with which it is formed integral and gradually decreasing in height from its outer to its inner end, the inner termini of the bases and their flanges on one side portion of the rim positioned in close proximity to the inner termini of the bases and their flanges positioned on the other side portion of the rim, the said opposed inner termini of the said bases and flanges positioned at the center of the rim, the said gripper element bases of each side portion of the rim projecting laterally from the outer edge of the side portion.

In testimony whereof, we affix our signatures hereto.

FRIEDRICH W. BRANDT.
CARL M. WILES.